US012162741B2

(12) United States Patent
Van Laarhoven et al.

(10) Patent No.: US 12,162,741 B2
(45) Date of Patent: Dec. 10, 2024

(54) METHOD AND APPARATUS FOR REALIZING AN ASEPTIC CONNECTION BETWEEN A VALVE UNIT AND A TANK CONTAINER

(71) Applicant: MEGA-INLINER INTERNATIONAL GROUP BV, Valkenswaard (NL)

(72) Inventors: Sidonius Joseph Victor Marie Van Laarhoven, Valkenswaard (NL); Robin William Anton Bruil, Bergeijk (NL); Barry Fransiscus Wilhelmus Van Barschot, Valkenswaard (NL); Wilhelmus Theodorus Maria Van Barschot, Valkenswaard (NL)

(73) Assignee: MEGA-INLINER INTERNATIONAL GROUP B.V., Valkenswaard (NL)

( * ) Notice: Subject to any disclaimer, the term of this patent is extended or adjusted under 35 U.S.C. 154(b) by 0 days.

(21) Appl. No.: 17/792,774

(22) PCT Filed: Jan. 17, 2021

(86) PCT No.: PCT/NL2021/050019
§ 371 (c)(1),
(2) Date: Jul. 14, 2022

(87) PCT Pub. No.: WO2021/145765
PCT Pub. Date: Jul. 22, 2021

(65) Prior Publication Data

US 2023/0051923 A1 Feb. 16, 2023

(30) Foreign Application Priority Data

Jan. 16, 2020 (NL) ...................................... 2024686

(51) Int. Cl.
*B67D 1/00* (2006.01)
*B65D 90/04* (2006.01)
(Continued)

(52) U.S. Cl.
CPC ......... *B67D 1/0887* (2013.01); *B65D 90/046* (2013.01); *B67D 1/0004* (2013.01);
(Continued)

(58) Field of Classification Search
CPC ...... B67D 1/0887; B67D 1/0004; B67D 3/04; B67D 2001/075; B67D 2001/0827; B67D 1/07; B65D 90/046; B65D 2590/046
See application file for complete search history.

(56) References Cited

U.S. PATENT DOCUMENTS 4,375,864 A * 3/1983 Savage ................ B65D 77/067
222/499
5,072,857 A * 12/1991 Coleman ............. B65D 77/068
222/105
(Continued)

FOREIGN PATENT DOCUMENTS

| | | |
|---|---|---|
| EP | 1 719 714 | 11/2006 |
| WO | 99/47432 | 9/1999 |
| WO | 03/033376 | 4/2003 |

OTHER PUBLICATIONS

International Search Report for PCT/NL2021/050019 dated May 19, 2021, 3 pages.
Written Opinion of the ISA for PCT/NL2021/050019 dated May 19, 2021, 7 pages.

*Primary Examiner* — Frederick C Nicolas
(74) *Attorney, Agent, or Firm* — NIXON & VANDERHYE P.C.

(57) ABSTRACT

Methods for realizing an aseptic connection between a valve unit and a tank container having an inliner are provided whereby, a disinfection unit which includes the valve unit is positioned around the spout of the tank container. The valve unit is then disinfected by exposing the valve unit to a disinfection fluid and/or to electromagnetic radiation while the valve of the valve unit is in an open position. After having closed the valve, an end portion of the valve unit is
(Continued)

pressed against a closure element that blocks the spout of the inliner, to thereby establish fluid communication between the inner environment of the inliner and the interior of the valve unit. The disinfection unit is then removed and the valve unit is fastened to the tank container to ensure an aseptic connection between the valve unit and the tank container.

16 Claims, 3 Drawing Sheets

(51) Int. Cl.
*B67D 1/08* (2006.01)
*B67D 3/04* (2006.01)
*B67D 1/07* (2006.01)

(52) U.S. Cl.
CPC .......... *B67D 3/04* (2013.01); *B65D 2590/046* (2013.01); *B67D 1/07* (2013.01); *B67D 2001/075* (2013.01); *B67D 2001/0827* (2013.01)

(56) References Cited

U.S. PATENT DOCUMENTS 5,095,962 A * 3/1992 Lloyd-Davies ......... B65B 3/045 141/354
5,102,010 A * 4/1992 Osgar .................... B65D 47/36 222/541.9
5,115,943 A * 5/1992 Coleman .............. B65D 77/068 222/105
5,890,616 A * 4/1999 Cravens ................. B65D 25/16 220/495.08
6,293,432 B1 * 9/2001 Hartwall .............. B65D 77/061 222/93
6,427,872 B1 * 8/2002 Anderson ............. B65B 55/022 222/541.2
6,454,134 B1 * 9/2002 Aujesky ................. B65D 77/06 222/105
6,988,639 B2 * 1/2006 Arch .................... B65D 77/061 222/105
2008/0006636 A1 * 1/2008 Wild .................... B65D 77/061 220/9.1

* cited by examiner

METHOD AND APPARATUS FOR REALIZING AN ASEPTIC CONNECTION BETWEEN A VALVE UNIT AND A TANK CONTAINER

This application is the U.S. national phase of International Application No. PCT/NL2021/050019 filed Jan. 17, 2021 which designated the U.S. and claims priority to NL 2024686 filed Jan. 16, 2020, the entire contents of each of which are hereby incorporated by reference.

FIELD OF THE INVENTION

The invention relates to a method for realizing an aseptic connection between a valve unit and a tank container comprising an inliner with the aid of a disinfection unit, to an assembly of a valve unit and a disinfection unit and to a tank container comprising such assembly.

BACKGROUND

For the transportation and preservation/storage of liquid products, it is common practice to use tank containers wherein such liquids temporarily reside, and which have dimensions that allow them to be transported over common (rail) roads and on (container)ships. They usually have a volume in the range of 5.000 $dm^3$ to 50.000 $dm^3$ and are shaped in a more or less cylindrical form. Such tank containers are usually filled and emptied via a spout that is present at or near their bottom.

To avoid contact of the charged liquid with the inside of the tank container, the liquid may be completely contained in a so-called inliner. After discharge of the liquid, the inliner is removed from the tank container. Since no traces of liquid are then left in the interior of the container, the container does not have to be cleaned—a laborious and expensive process that is not environmentally friendly. Another important function of such inliner is to protect the liquid in the container against contamination, decay and spoilage. Moreover, since a new inliner is aseptic and void of contaminants by nature, and since for each new charge of the container a new inliner may be used, a higher degree of cleanliness can be achieved when an inliner is used.

During the filling and discharging of a tank container, there is a risk of introducing contaminants and/or microorganisms into the liquid. This may especially occur when a hose for the supply or discharge has to be connected to the spout. Although the presence of an inliner in the container does in principle not affect the risk on contamination, the effect of contamination is more pronounced in an inliner than in an unprotected container, because an inliner has a much higher cleanliness from itself and an inliner-less container has a higher background of contaminations. In other words, the relative impact of a contamination is higher when an inliner is used in a tank container.

Therefore, with the higher standards of cleanliness that can be imposed due to the use of inliners, there is an increased need for creating aseptic conditions during the filling and discharging of a tank container. However, proper means for disinfection are not yet available. In particular, there is no equipment that ensures that all parts where the liquid charge passes remain aseptic, and that the inliner's interior is closed off from the outside environment at all times.

SUMMARY OF THE INVENTION

It is therefore an objective of the invention to provide a method and equipment that solves one more of the above problems.

Therefore, the present invention relates to a method for realizing an aseptic connection between a valve unit and a tank container that comprises an inliner, the method comprising providing 1) a tank container and an inliner which is present in an interior of the tank container, wherein
   - the tank container as well as the inliner comprises a spout for the supply and discharge of a liquid;
   - the spout of the inliner is placed in the spout of the tank container;
   - the spout of the inliner is closed by a closure element separating an inner environment of the inliner from an outer environment, which closure element is capable of being punctured and/or displaced from the spout so as to allow supply and discharge of liquid through the spout;
2) a valve unit comprising a tube having
   - a first end portion comprising a valve that is configured to open and close the tube at the first end portion;
   - a second end portion that is capable of displacing the closure element from the spout and/or of or puncturing the closure element;
   - an interior that extends from the valve to the second end portion; wherein the valve unit is equipped with fastening means for fastening the valve unit to the spout of the tank container (or to the tank container itself) to ensure an aseptic connection between the valve unit and the tank container, in particular between the tube of the valve unit and the spout of the inliner;
3) a disinfection unit comprising a wall defining an interior space, wherein
   - the wall comprises an opening for receiving into the interior space the valve unit that is to be disinfected, which opening is adapted to abut and/or enclose the spout of the tank container;
   - the disinfection unit comprises means for exposing the interior of the tube of the valve unit to a disinfection fluid and/or to electromagnetic radiation;
   - the disinfection unit is provided with means for changing the position of the valve unit in the disinfection unit and for pressing the second end portion of the tube of the valve unit against the closure element of the inliner when 1) the valve unit is contained in the interior space of the disinfection unit; and 2) the opening of the disinfection unit is placed against and/or around the spout of the tank container;

and thereafter performing the steps of a) placing the valve unit into the interior space of the disinfection unit and placing the opening of the disinfection unit against or around the spout of the tank container; thereafter
b) disinfecting the valve unit by exposing the interior of the tube of the valve unit to a disinfection fluid and/or to electromagnetic radiation while the valve is in an open position; thereafter
c) closing the valve of the valve unit; thereafter
d) pressing the second end portion of the tube of the valve unit against the closure element that is present in the spout of the inliner so that the closure element becomes displaced or punctured and a fluid connection is generated between the second end portion of the tube and the spout, providing the inner environment of the inliner and the interior of the tube in fluid communication; thereafter
e) removing the disinfection unit from the valve unit and fastening the valve unit to the spout of the tank container to ensure an aseptic connection between the valve unit and the tank container, in particular between the tube of the valve unit and the spout of the inliner; thereafter f) optionally covering the first end portion of the tube with a cap.

The invention further relates to an assembly suitable for use in this method and to a tank container comprising such assembly.

DETAILED DESCRIPTION OF THE INVENTION

Figure 1:
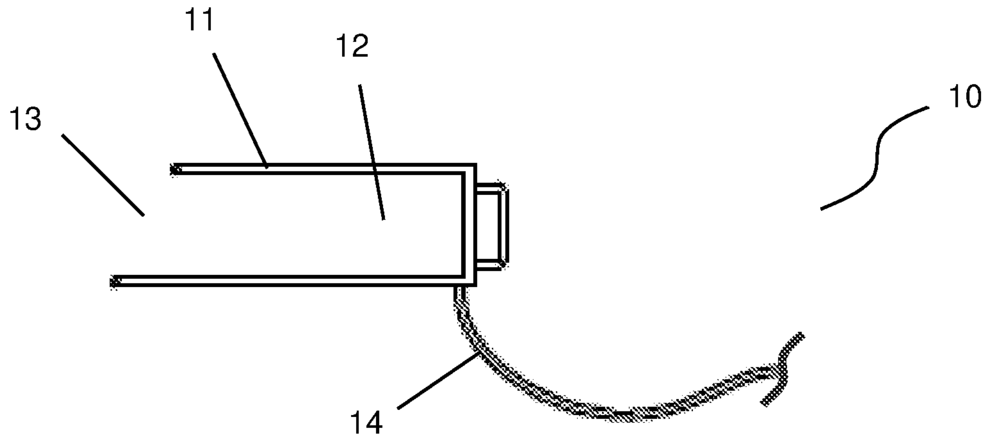
FIG. 1 displays a cross-sectional view of a disinfection unit (10) in the method of the invention.

Elements in the figures are illustrated for simplicity and clarity and have not necessarily been drawn to scale. For example, the dimensions of some of the elements in the figures may be exaggerated relative to other elements to help improve understanding of various exemplary embodiments of the present invention. Furthermore, the terms "first", "second", and the like herein, if any, are generally used for distinguishing between similar elements and not necessarily for describing a sequential or chronological order.

In the context of the invention, by the term "aseptic" is meant "free or freed from germs and any other unwanted micro-organism". By an aseptic connection is meant a connection that is gas-tight and liquid-tight, and so does not allow that any germs and any other unwanted micro-organism can pass, e.g. from an outer environment to an inner environment. As a result, an aseptic connection does neither allow the passage of other pollutions such as sand, dust, liquids and gases, in particular gases such as oxygen.

The tank container in the method and the assembly of the invention may in principle be any type of tank container, as long as it has an interior in which an inliner may be placed, and in such manner that the spout of the inliner fits into the spout of the tank container. Typically, both spouts are designed such that, when combined, the outer circumference of the spout of the inliner is adjacent to the inner circumference of the spout of the tank container, preferably in a tight fit.

The tank container is preferably of a cylindrical or cylindrical-like shape, since inliners experience less stress forces in such containers than in containers with e.g. flat walls and corners.

A tank container typically comprises a manhole, which is an opening in the wall of the container that can be shut off with a lid. Such opening is usually circular with a diameter in the range of 25-50 cm and can be used to introduce an inliner in the tank container. Preferably, it is located close to the spout, e.g. at a distance thereof that is 0.5-3 times its diameter. Usually, the tank container also comprises a venting hole for the release of air during the filling of the container.

The tank container in the method and the assembly of the invention has an interior in which an inliner is present. The inliner is configured as a bag and defines an interior space for storing a liquid. It comprises an opening for the supply and discharge of a liquid charge, which opening merges into a spout. The tank container also comprises an opening with a spout to allow for the supply and discharge of a liquid charge. This spout is typically a tube-like structure that extends, at a particular angle, from the container. Both spouts are designed such that the spout of the inliner can be inserted into the spout of the container. When a method of the invention is carried out, the spout of the inliner is present in the spout of the container. When, thereafter, the inliner is actually being filled or emptied with liquid, the spout of the inliner is still present in the spout of the container. Accordingly, also for a tank container comprising an assembly of the invention, the spout of the inliner is present in the spout of the container.

In a method of the invention, the inliner has an inner environment that is initially closed-off from an outer environment by a closure element. This closure element is typically placed in or at the spout, so that it blocks the spout and separates the interior of the inliner from an environment outside the inliner. It is capable of becoming displaced from its position (e.g. by pushing it into the interior of the inliner) or of becoming disrupted/punctured, so that supply and discharge of liquid through the spout of the inliner becomes possible. Displacement or puncture of the closure element in a method of the invention occurs when it is pressed against by the second end portion of the tube of the valve unit.

In a preferred method, the closure element of the spout is a stopper with a shape that is complementary to the shape of the spout, which stopper is initially present in the spout and so blocks the spout. It is held by the circumferential wall of the spout due to the tight fit it has in the spout, and is kept in position by the friction with the inner wall of the spout. When pressed against by the second end portion of the tube of the valve unit, the closure element is displaced, releases from the spout and ends up somewhere in the inliner.

In an alternative method, the closure element of the spout of the inliner is a membrane that separates the interior of the inliner from an environment outside the inliner, which membrane is capable of being disrupted and/or punctured when pressed against by the second end portion of the tube.

Figure 4:
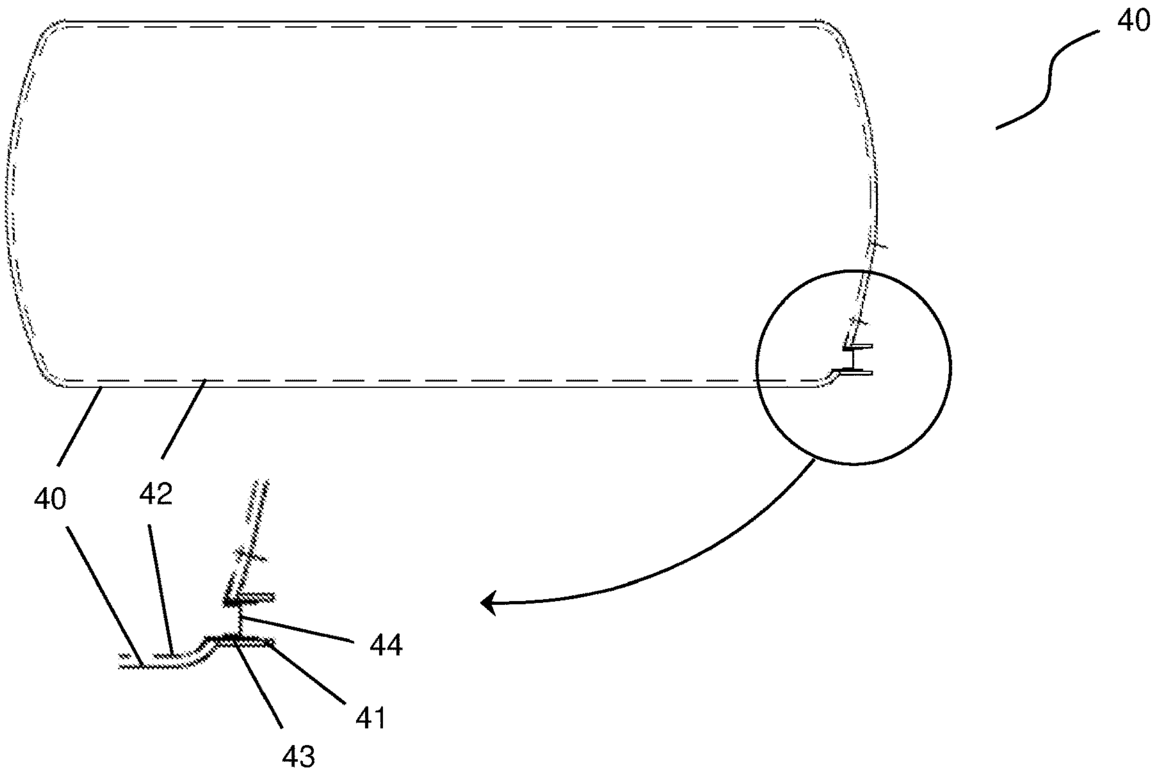
FIG. 4 displays a cross-sectional view of a tank container (40) in the method of invention.

FIG. 4 displays a cross-sectional view of a tank container (40) comprising a spout (41). In the interior of the container (40) is present an inliner (42). The inliner (42) comprises a spout (43) and a closure element (44).

The valve unit in a method and assembly of the invention provides the container with means to open and close the spout of the tank container so that there is control over the flow of liquid through the spout. It may shut off the spout so that no liquid can enter or exit the tank container, or it may be open and so allow the passage of liquid so that the tank container can be filled or emptied.

A permanent connection between a valve (or a unit comprising a valve) and a tank container is not preferred since this would go at the expense of tank volume, since the dimensions of a tank container have to be within certain standard dimensions, often legally prescribed, for tank containers. Moreover, for a proper and aseptic installation of the inliner in the tank container, it is inconvenient when the spout of the container is always capped with a valve. Therefore, it is preferred that a valve is only temporarily connected to the tank container when a tank container needs to be charged or emptied. Such temporary and aseptic connection is provided for by a method of the invention.

A valve for the opening and closure of the spout is part of the valve unit. Such unit comprises a tube that is equipped with a valve on one end portion (i.e. the first end portion), wherein the valve is designed to open or close the interior of that tube at the first end portion. The other end portion (i.e. the second end portion) is permanently open and serves as a means to displace the closure element from the spout of the inliner. When the valve unit is being placed in position, it presses against the closure element and so displaces it. This is also meant to include puncturing or rupturing of the closure element, in the event that the closure element is a membrane that is to be destructed by pressure of a protruding object such as the first end portion. After displacement or destruction of the closure element, the second end portion is further pressed into the spout until both components are coupled and have a leak-tight fit. Then, a fluid connection is generated between both components, so that the inner environment of the inliner and the interior of the tube are in fluid communication. By a fluid connection is meant an arrangement (such as a coupling) of two components which allows a fluid to pass from one component to the other. Spaces within each component are then in fluid communication. In the present invention, one such component is the tube of the valve unit and the other is the spout of the inliner.

When the valve unit is in place, it needs to be fastened to the spout of the tank container (or to the tank container itself), to ensure that there is a sustainable and aseptic connection between (the tube of) the valve unit and the spout of the tank container, e.g. a connection that can withstand the pressures that are common during filling and emptying the tank container, when the liquid passes through the connection. Therefore, the valve unit is equipped with fastening means for fastening the valve unit to the spout of the tank container (or to the tank container itself).

For an improved air- and/or liquid-tightness of the connection, the spout of the inliner and the second end portion of the tube of the valve unit are preferably of a corresponding conical shape.

Figure 2:
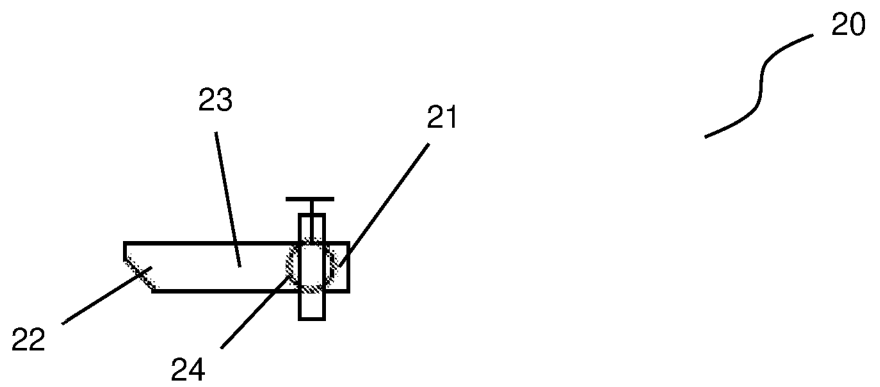
FIG. 2 displays a cross-sectional view of a valve unit (20) in the method of the invention.

FIG. 2 displays a cross-sectional view of a valve unit (20). It comprises a tube (23) having a first end portion (21) and a second end portion (22). A valve (24) is present at the second end portion (22), wherein the valve (24) is shown in an open position.

To keep the inner environment of the inliner aseptic, the displacement of the closure element should not occur under a normal atmosphere, because then pollution, germs or other unwanted micro-organisms gain access to the inner environment of the inliner. Therefore, the valve unit is temporarily shielded by a disinfection unit. In the interior of this unit, an aseptic environment is created by a disinfection process that is applied prior to the displacement of the closure element. During this process, the valve of the valve unit has to be open, so that the entire interior of the tube, from the first end portion to the second end portion, also becomes disinfected. The disinfection also includes that side of the closure element that faces the environment outside the inliner.

Thus, the disinfection unit comprises a wall that defines an interior space, which wall comprises an opening for bringing the valve unit into the interior space. The opening is further adapted to abut and/or enclose the spout of the tank container. It is not necessary that the disinfection unit is tightly connected to the tank container and/or its spout (liquid-tight and/or gas-tight). For example, the disinfection unit is loosely slided over the spout, e.g. as a sort of slip case. The disinfection unit may also surround the spout without being in contact with it. Since during (and possibly also after) disinfection an overpressure is usually generated in the interior space of the disinfection unit by the release of gas and/or liquid into the interior of the tube and/or the disinfection unit, unwanted pollutions and germs of the external environment do not have a chance to enter the interior space of the disinfection unit through accidental chinks or gaps. A connection that is not liquid-tight or gas-tight then does not disturb the asepticity of the interior of the tube.

It is, on the other hand, also possible that the disinfection unit is indeed firmly connected to the tank container and/or its spout, for example in a manner that is liquid-tight and/or gas-tight. A pressure relief valve may then be present in the disinfection unit to accommodate for a pressure build-up during disinfection. A (firm) connection may also be designed such that it allows the passage of liquid or gas, so that any disinfection fluid or purge gas may escape "naturally" from the interior space of the disinfection unit.

Optionally, the disinfection unit is provided with fastening means for fastening the disinfection unit to the tank container. In the method, the actual connection of the disinfection unit to the tank container is then made before step d), but it may also be performed before step c) or before step b), in particular in step a). This is to ensure that the disinfection unit does not drop off from the valve unit and the tank container during the disinfection, the closing of the valve or the displacing/puncturing of the closure element. The latter is especially important when the pressing against the closure element is driven from within the disinfection unit (e.g. electrically, mechanically, hydraulically or pneumatically driven), because the connection of the disinfection unit to the tank container provides the required back force that prevents that the disinfection unit itself is pushed away from the spout.

The opening of the disinfection unit is adapted to abut and/or enclose the spout of a tank container. For example, the opening has a circular, elliptic, square or other polygonal shape, wherein the shape is of such dimension that it is capable of receiving the spout of a tank container and the valve unit. For example, the opening has a cross-section of which the longest dimension is 40 cm or less, 35 cm or less, 25 cm or less, 20 cm or less, or 15 cm or less. In particular, the opening has a cross-section of a circular shape with a diameter of 30 cm or less, 20 cm or less or 15 cm or less.

The disinfection unit is provided with means for changing the position of the valve unit in the disinfection unit. Such means then also have the function of pressing the second end portion of the tube of the valve unit against the closure element of the inliner. Such means are necessary since the process of the invention relies on the containment of the valve unit in the interior space of the disinfection unit. Also, during the process of the invention, the opening of the disinfection unit is placed against and/or around the spout of the tank container. As a result, the valve unit is shielded and cannot be accessed and operated directly.

For example, the valve unit in a method of the invention has a handle for handling of the valve unit and the disinfection unit has a design that allows that the handle can be held by an operator (e.g. by a slit through which the handle moves and penetrates). In this manner, an operator can move the valve unit towards the closure element of the inliner.

Alternatively, the disinfection unit or the valve unit may be equipped with an electric motor. In this way, the movement of the valve unit towards the closure element of the inliner can be electrically driven. This does not require an opening (such as a slit) in the wall of the disinfection unit as would be the case when the valve unit comprises a handle (in particular a handle that is allowed to have translational motion through a slit).

In another alternative, a pneumatic or hydraulic force is used to move the valve unit.

In yet another alternative, the movement can be initiated mechanically, e.g. by a rotating shaft that penetrates through the wall of the disinfection unit wherein an optional packing seal prevents the passage of any pollutions or germs along the shaft through the wall. The disinfection unit then typically comprises a mechanical element that converts the rotational motion of the shaft into translational motion of the valve unit.

In yet another alternative, the disinfection unit is provided with gloves, i.e. the gloves form the means for changing the position of the valve unit in the disinfection unit. Such gloves (typically two) are built into the disinfection unit and arranged in such a way that an operator can place his/her hands into the gloves and so perform tasks inside the disinfection unit without passage of undesired gases from the outside atmosphere into the interior space of the disinfection unit. Such tasks are typically the manipulation of the valve unit, such as holding it, pressing its second end portion against the closure element in the spout, fastening it to the spout of the tank container. A disinfection unit that is provided with gloves may bear resemblance to a glove-box that is used in research environments where people perform inert atmosphere work.

FIG. 1 displays a cross-sectional view of a disinfection unit (10). It comprises a wall (11) defining an interior space (12). The wall (11) comprises an opening (13) for receiving a valve unit (20). The disinfection unit (10) comprises means (14) for introducing a disinfection fluid into the interior space (12).

The disinfection unit and the valve unit are both designed such that the valve unit fits into the interior space of the disinfection unit. When put together in this manner, they form an assembly of the invention. Such assembly is suitable for use in a method according the invention.

Figure 3:
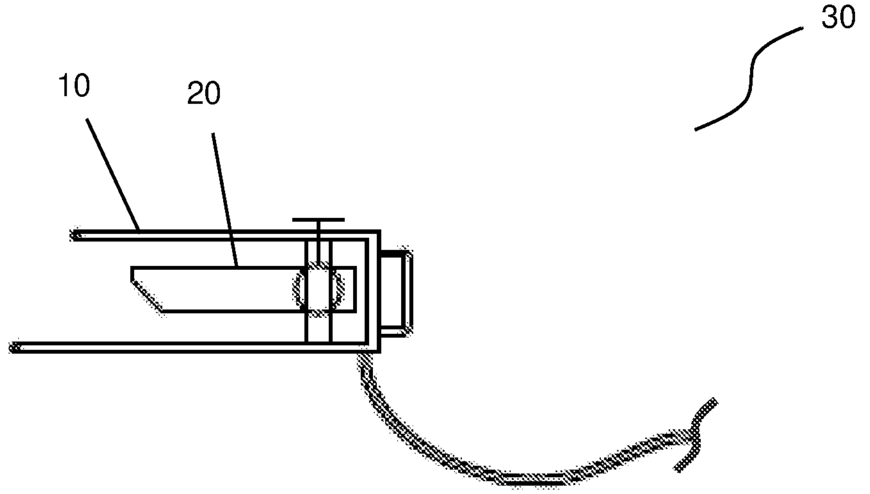
FIG. 3 displays a cross-sectional view of an assembly (30) of a valve unit and a disinfection unit of the invention.

FIG. 3 displays a cross-sectional view of an assembly (30) of a disinfection unit (10) and a valve unit (20), wherein the valve unit (20) is present in the interior space (12) of the disinfection unit (10).

In the method of the invention, the valve unit is placed into the interior space of the disinfection unit, followed by placing the opening of the disinfection unit against or around the spout of the tank container, so that it abuts and/or encloses the spout of the tank container. The second end portion of the tube of the valve unit is then in the vicinity of the closure element, but it has not yet punctured or displaced it.

Before, during or after the placement of the disinfection unit, the valve of the valve unit is opened. When the valve is open, the disinfection of the valve unit is performed. The disinfection is primarily directed at freeing the tube of the valve unit and nearby surfaces (e.g. that of the closure element and that of the valve itself) from germs and any other unwanted micro-organism. Depending on the disinfection method, it is also possible to remove other pollutions such as sand, dust, liquids and gases, in particular gases such as oxygen.

The disinfection typically comprises the release of a disinfection fluid in the tube, which fluid is typically fed from a source outside the disinfection unit through an inlet in the disinfection unit. The release of such disinfection fluid creates a small overpressure in the interior space and can escape through e.g. a discontinuity in the wall of the disinfection unit (a hole, a slit, a vent hole) or an opening at an interface of the tank container with the disinfection unit.

The disinfection fluid may be selected from the group of water, steam, ethanol, ozone, carbon dioxide gas and nitrogen gas. Application of the fluid may occur at ambient conditions but also at elevated temperatures, e.g. at a temperature of at least 80° C., least 100° C., or least 120° C. It may e.g. be in the range of 95-115° C. The choice of fluid and temperature is subject to the nature of the materials that are exposed during disinfection, in particular to the nature of the material of the inliner and the closure element, since these are typically made of plastic, such as polyethylene. Other components such as the valve unit and the disinfection unit are often made of stainless steel.

Alternatively, the disinfection is performed by exposure of the tube to electromagnetic radiation, for example ultraviolet radiation. In such case, the disinfection unit is provided with a source of electromagnetic radiation.

Optionally, after the disinfection in step b), a flow of a gas is released into the interior space, preferably a dry and inert gas, which flow has the function of preventing unwanted pollutions and germs of the external environment to enter the interior space of the disinfection unit. In addition, it may evaporate eventual liquid components of the disinfection fluid that remain in the interior of the tube after the disinfection (e.g. water and/or ethanol). Such gas flow creates a small overpressure in the interior space and can escape through e.g. a discontinuity in the wall of the disinfection unit (a hole, a slit, a vent hole) or an opening at an interface of the tank container with the disinfection unit. In this way, the interior space of the disinfection fluid and/or of the tube is continuously purged with such gas. Such purging is typically terminated before or during closing of the valve in step c).

After the treatment with the disinfection fluid or the electromagnetic radiation, the valve is closed. In case the fluid has left behind some traces of a liquid (e.g. when ethanol or water/steam has been used), then a dry gas such as dry nitrogen may be purged through the tube to allow evaporation and removal of the liquid, which is then followed by closing the valve. It is in principle also possible that the valve of the valve unit is already closed during the disinfection of the valve unit, i.e. during the treatment with the disinfection fluid.

After closing of the valve, the second end portion of the tube of the valve unit is pressed against the closure element of the spout so that the closure element becomes displaced or punctured and a fluid connection is generated between the tube and the spout. The inner environment of the inliner and the interior of the tube are then in fluid communication. The second end portion of the tube is usually designed in such manner that its shape is complementary to that of the spout of the inliner, so that the valve unit nicely fits in the spout after the pressing. This has the effect that the valve unit is more or less connected to the tank container after the pressing.

Figure 5:
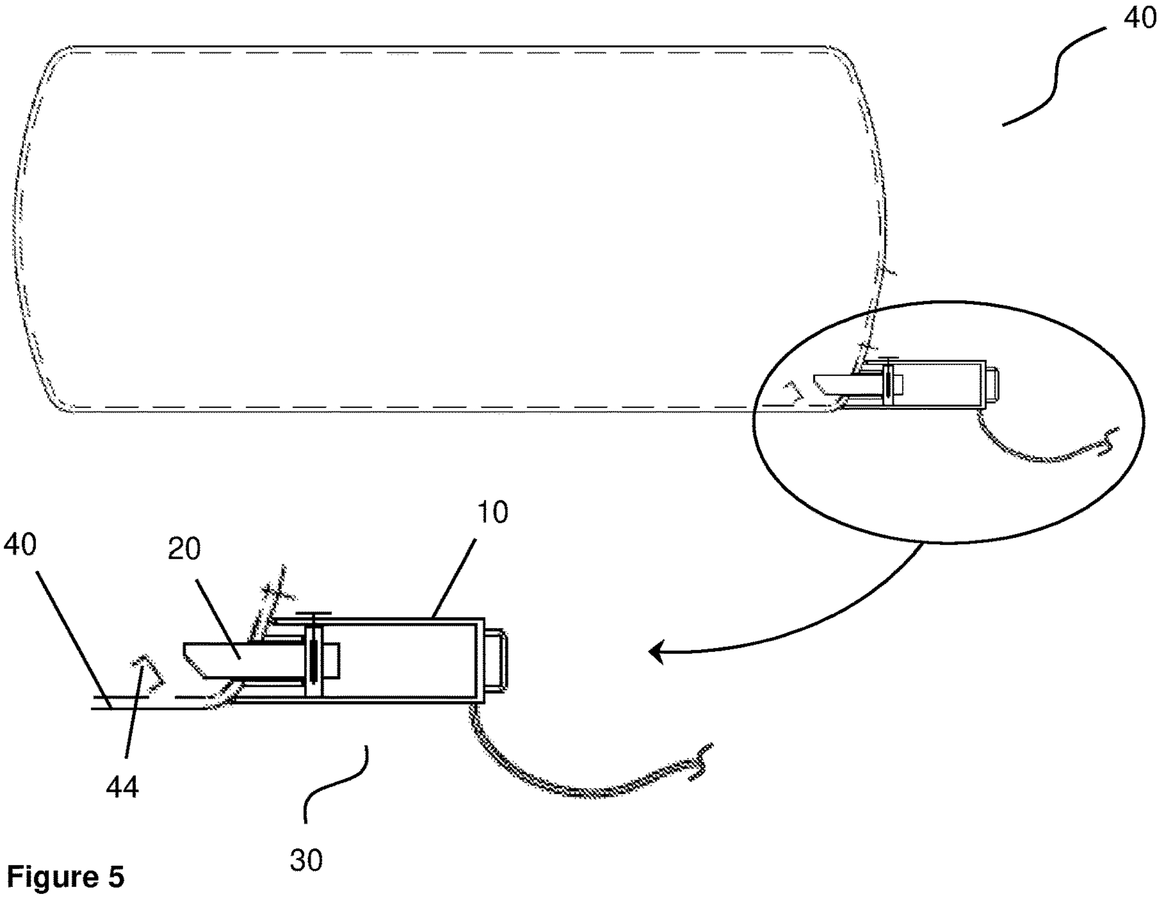
FIG. 5 displays a cross-sectional view of a tank container (40) comprising an assembly (30) of the invention.

This situation is visualized in FIG. 5, displaying a cross-sectional view of a tank container (40) comprising an assembly (30) of the invention. The second end portion (22) of the tube (23) of the valve unit (20) has been penetrated though the spout (41) of the tank container (40) and through the spout (43) of the inliner (42). The closure element (44) has been dislocated from the spout (43) by the second end portion (22) and resides in the interior of the tank container (40). The disinfection unit (10) still surrounds the valve unit (20), but is to be removed in a next step of the method.

Since the valve unit itself is shielded by the disinfection unit and the spout of the tank container, moving of the valve unit towards the closure element and displacing/puncturing it is usually performed in an indirect manner. For example, the valve unit comprises a handle for pressing the second end portion of the tube of the valve unit against the closure element, which handle can be operated from the outside, i.e. when the valve unit is enclosed by the disinfection unit. In this way, an operator can press the second end portion of the tube of the valve unit against the closure element of the inliner. Alternatively, the disinfection unit may comprise a handle, which is then operably connected to the valve unit. In either case, the handle can move the valve unit in the desired direction (i.e. usually towards the closure element). Usually, such handle requires a discontinuity of the wall of the disinfection unit (e.g. a slit for translational movement of the handle), because the handle has to be accessible to an operator. One way of maintaining the aseptical interior of the tube of the valve unit is to use an overpressure of the disinfection fluid—the fluid may then escape through the discontinuity designed for the handle (and eventual other discontinuities) and so prevent undesired inflow of gas (outside atmosphere) into the interior space of the disinfection unit. To further reduce the inflow, the disinfection unit may be equipped with flexible parts (e.g. rubber flaps) that are pushed backwards locally when the handle is operated.

The disinfection unit may also comprise an electrically, hydraulically or pneumatically driven mechanism that is designed to move the valve unit in the desired direction, in particular to press the second end portion of the tube of the valve unit against the closure element of the inliner. For example, an electric actuator, a pneumatic actuator or an hydraulic actuator is present. It is also possible that an electrical motor is present which is capable of moving the valve unit in the interior space of the disinfection unit.

The moving of the valve unit towards the closure element and displacing/puncturing it may also be performed in a more direct manner. This is for example possible when an operator can directly manipulate the valve unit via gloves that are built into the disinfection unit.

After the puncturing or displacement of the closure element, the disinfection unit is removed from the spout of the tank container, and simultaneously also from the valve unit.

During or shortly after the removal, the valve unit is fastened to the spout of the tank container (or to the container itself) to ensure a leak-tight (i.e. aseptic) connection between the valve unit and the tank container. When the fastening is performed after the removal, it is preferred that the second end portion of the tube is completely enclosed by the spout so that the interior of the tube remains aseptic.

The fastening may also be performed before removal of the disinfection unit, although the viability thereof depends on the type of fastening means and the design of the disinfection unit. For example, when the fastening means are completely contained within the interior space of the disinfection unit, it may be difficult to access the fastening means. This may be overcome by installing additional operating means that allow the realization of the fastening. A more elegant solution to the problem of accessibility is offered by using gloves that are built into the disinfection unit, as is described above.

At this stage (i.e. after the fastening), the tank container is ready for being charged with a liquid. This is typically performed by connecting the first end portion of the tube to a hose or pipe that is connected to a storage or processing facility of the liquid (e.g. in a factory, brewery, bottling facility or a place where consumption of the liquid occurs). Such connection is also made under aseptic conditions; the required procedures for this are known in the art. When the valve of the valve unit is opened, then the liquid contents of the storage or processing facility may flow into or out of the aseptic tank container.

Figure 6:
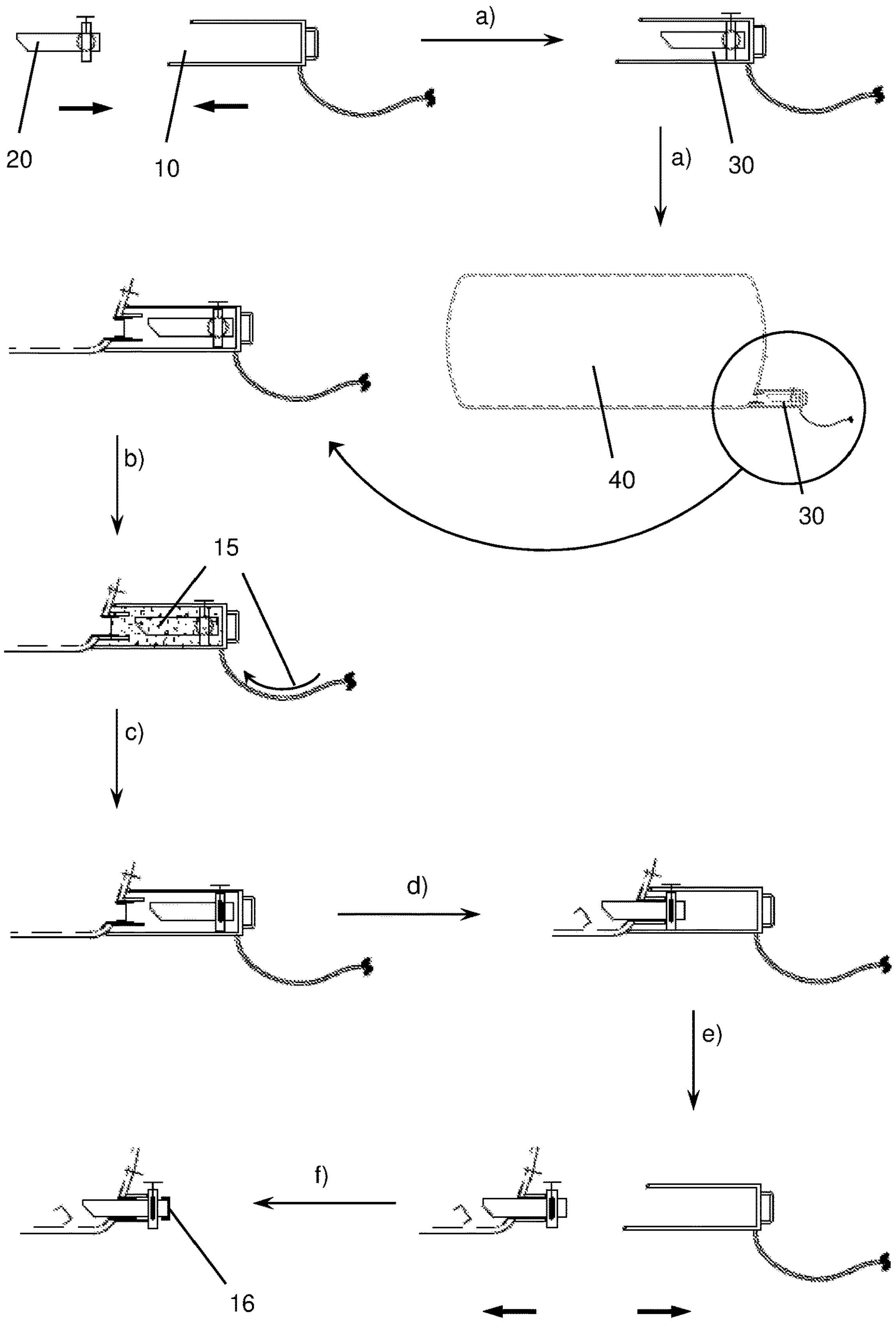
FIG. 6 is a representation of the different steps of the method of the invention.

The method of the invention as described above is illustrated in FIG. 6. In step a) two actions are performed. This concerns 1) placing a valve unit (20) into a disinfection unit (10) yielding assembly (30); and 2) placing the opening of the disinfection unit around the spout of the tank container (40). Then, in step b) of the method, the interior of the valve unit (20) is disinfected with disinfection fluid (15), visualized by a shading in the interior space of the disinfection unit (10) and in the interior of the tube of the valve unit (20). During the disinfection, the valve is in an open position so that the interior of the tube as well as the valve become disinfected (i.e. aseptic). This is then followed by closure of the valve (24) of the valve unit (20) in step c). The second end portion (22) of the tube (23) of the valve unit (20) is then pressed against the closure element (44) in step d), generating a fluid connection between the second end portion (22) of the tube (23) and the spout (43). Finally, in step e) the disinfection unit (10) is removed from the valve unit (20). The valve unit (20) is then fastened to the spout of the tank container (40) (fastening is not shown for reasons of clarity). Optionally, a cap (16) is placed on the first end portion (21) of the valve unit (20).

The invention further relates to an assembly (FIG. 3) of a valve unit and a disinfection unit, for use in a method as described above, wherein the disinfection unit comprises
- a wall defining an interior space, the wall comprising an opening for receiving into the interior space the valve unit, which opening is adapted to abut and/or enclose the spout of a tank container;
- means for exposing the interior of the tube of the valve unit to a disinfection fluid and/or to electromagnetic radiation;

the valve unit
- is present in the interior space of the disinfection unit;
- comprises a tube having
  - a first end portion comprising a valve that is configured to open and close the tube at the first end portion;
  - a second end portion;
  - an interior that extends from the valve to the second end portion;
- is equipped with fastening means for fastening the valve unit to the spout of a tank container to ensure an aseptic connection between the valve unit and the tank container;

the disinfection unit and/or the valve unit is/are provided with means to change the position of the valve unit in the disinfection unit, in particular with means for pressing the second end portion of the tube of the valve unit against a closure element when the assembly is used in a method as described above (i.e. a method for realizing an aseptic connection between a valve unit and a tank container that comprises an inliner with such closure element).

To be able to maneuver the valve unit inside the disinfection unit, the valve unit preferably comprises a handle that goes through the wall defining an interior space. The means to change the position of the valve unit in the disinfection unit may therefore comprise such handle. The handle may be operated by a person who performs the method of the invention. Alternatively, the means to change the position may comprise an electric actuator, a pneumatic actuator or an hydraulic actuator. In particular, the valve unit or the disinfection unit may be equipped with an electric motor with which the valve unit can be guided towards the closure element and displace or puncture it.

In yet another alternative, the means to change the position of the valve unit in the disinfection unit may comprise gloves (typically two) that are built into the disinfection unit and arranged in such a way that an operator can place his/her hands into the gloves and so perform tasks inside the disinfection unit without passage of undesired gases from the outside atmosphere into the interior space of the disinfection unit. Such tasks are typically the manipulation of the valve unit, such as holding it, pressing its second end portion against the closure element in the spout, fastening it to the spout of the tank container. A disinfection unit that is provided with gloves may bear resemblance to a glove-box that is used in research environments where people perform inert atmosphere work.

The invention further relates to a tank container comprising the assembly as described above (FIG. 5), wherein the tank container comprises a spout for the supply and discharge of a liquid;

an inliner in an interior of the tank container, wherein the inliner comprises an inner environment and a spout for the supply and discharge of a liquid, which spout is present in the spout of the tank container;

wherein the second end portion of the tube is present in the spout of the inliner (and thus also in the spout of the tank container) so that there is a fluid connection between the second end portion of the tube and the spout, providing the inner environment of the inliner and the interior of the tube in fluid communication;

the valve unit is fastened to the spout of the tank container to ensure an aseptic connection between the valve unit and the tank container, in particular between the tube of the valve unit and the spout of the inliner.

As mentioned above, the disinfection unit may be connected to the tank container or to the spout of the tank container. This is however not a necessity, since it is present around the valve unit only for a relatively short period of time, during which an operator can hold it in place. It may for example also be slided over the spout so that it is supported without being fixated. In this way, it does not fall off but stays in place during this short period.

When the method of the invention is carried out, the inliner is in principle empty. It will therefore not contain the same volume it would have when the container (and thus the inliner) is charged with a liquid. Typically, the inliner is folded and/or rolled up prior to charging it, resulting in only a small interior volume. Most of this volume is typically present at and near the spout of the inliner. For example, the available volume in the interior of the inliner is less than 0.01%, in particular less than 0.005%, of the volume of the interior of the tank container.

It is an advantage of the method of the invention that the use of the disinfection unit provides a simple and reliable means for creating a leak-tight and aseptic connection between the inliner in the tank container and an external unit that provides or receives the liquid charge of the tank container. The method ensures that all parts where the liquid charge passes remain aseptic, and that the inner environment of the inliner is closed off from the outside environment at all times.

After charging and discharging of the fluid in and from the tank container, the inliner has fulfilled its function and is usually disposed. The valve unit can be reused, however. It is easily removable from the tank container and can be cleaned as such. This allows its reuse for a subsequent charge in the tank container. Also the disinfection unit can be reused.

The invention claimed is:

1. A method for aseptically connecting a valve unit and a tank container that comprises an inliner, wherein the method comprises:

(1) providing a tank container and an inliner which is present in an interior of the tank container, wherein (1a) each of the tank container and the inliner comprises a spout to allow for supply and discharge of a liquid; wherein (1b) the spout of the inliner is present in the spout of the tank container; and wherein (1c) the spout of the inliner includes a closure element which closes the spout of the inliner and separates an inner environment of the inliner from an outer environment of the inliner, wherein the closure element is capable of being punctured and/or displaced from the spout of the inliner so as to allow the supply and discharge of the liquid therethrough;

(2) providing a valve unit comprising a tube having first and second end portions, wherein (2a) the first end portion of the tube comprises a valve that is configured to open and close the tube at the first end portion thereof; and wherein (2b) the second end portion of the tube is capable of displacing the closure element from the spout of the inliner and/or is capable of puncturing the closure element; and wherein (2c) the tube defines an interior that extends from the valve to the second end portion thereof; and wherein (2d) the valve unit comprises a fastening member which is adapted to fasten the valve unit to the spout of the tank container to thereby ensure an aseptic connection between the valve unit and the tank container; and (3) providing a disinfection unit comprising a wall defining an interior space, wherein (3a) the wall comprises an opening into the interior space for receiving the valve unit, the opening being adapted to abut and/or enclose the spout of the tank container; and wherein (3b) the disinfection unit includes a device capable of exposing the interior of the tube of the valve unit to a disinfection fluid and/or to electromagnetic radiation; and wherein (3c) the disinfection unit is provided with a positioning member to change a position of the valve unit in the disinfection unit and press the second end portion of the tube of the valve unit against the closure element of the inliner, when the valve unit is contained in the interior space of the disinfection unit and when the opening of the disinfection unit is placed against and/or around the spout of the tank container; and thereafter the process comprises the sequential steps of:

a) placing the valve unit into the interior space of the disinfection unit and placing the opening of the disinfection unit against or around the spout of the tank container;

b) disinfecting the valve unit by exposing the interior of the tube of the valve unit to the disinfection fluid and/or to the electromagnetic radiation while the valve is in an open position;

c) closing the valve of the valve unit;

d) pressing the second end portion of the tube of the valve unit against the closure element that is present in the spout of the inliner so that the closure element becomes displaced or punctured and a fluid connection is generated between the second end portion of the tube and the spout, thereby establishing fluid communication between the inner environment of the inliner and the interior of the tube; and e) removing the disinfection unit from the valve unit and fastening the valve unit to the spout of the tank container to ensure an aseptic connection between the valve unit and the tank container.

2. The method according to claim 1, wherein the closure element of the spout of the inliner is a stopper having a shape that is complementary to the shape of the spout of the inliner, and wherein the stopper is initially present in the spout thereby blocking the spout and is after the disinfection released from the spout, by pressing the second end portion of the tube against the stopper.

3. The method according to claim 1, wherein the closure element of the spout of the inliner is a membrane capable of being disrupted and/or punctured when pressed against by the second end portion of the tube.

4. The method according to claim 1, wherein the valve unit and/or the disinfection unit comprise a handle for pressing the second end portion of the tube of the valve unit against the closure element, wherein the handle is capable of being operated when the valve unit is enclosed by the disinfection unit.

5. The method according to claim 1, wherein the pressing of the second end portion against the closure element of the inliner is performed with the aid of an electrically, mechanically, hydraulically or pneumatically driven mechanism.

6. The method according to claim 1, wherein the spout of the inliner and the second end portion of the tube have a corresponding conical shape.

7. The method according to claim 1, wherein the disinfection unit includes a fastening member to fasten the disinfection unit to the tank container, and wherein the method comprises connecting the disinfection unit to the tank container before step d).

8. The method according to claim 1, wherein the disinfection fluid is selected from the group consisting of water, steam, ethanol, ozone, carbon dioxide gas and nitrogen gas.

9. The method according to claim 1, wherein, after disinfecting the valve unit according to step b), the method comprises the step of purging the interior space of the disinfection unit and/or the interior of the tube with a gas.

10. The method according to claim 1, which further comprises the step of:

f) covering the first end portion of the tube with a cap.

11. An assembly to provide an aseptic connection between a valve unit and a tank container which comprises an inliner present in an interior of the tank container, wherein each of the tank container and the inliner comprises a spout to allow for supply and discharge of a liquid, and wherein the spout of the inliner is placed in the spout of the tank container, and wherein the spout of the inliner includes a closure element which closes the spout of the inliner and separates an inner environment of the inliner from an outer environment of the inliner, and wherein the closure element is capable of being punctured and/or displaced from the spout of the inliner so as to allow the supply and discharge of the liquid therethrough; and wherein the assembly comprises the valve unit and a disinfection unit, wherein (a) the disinfection unit comprises a wall defining an interior space, the wall comprising an opening for receiving the valve unit into the interior space of the disinfection unit, the opening being adapted to abut and/or enclose the spout of the tank container; and wherein;

(b) the valve unit is present in the interior space of the disinfection unit and comprises a tube having:

a first end portion comprising a valve that is configured to open and close the tube at the first end portion;

a second end portion; and an interior that extends from the valve to the second end portion; wherein the disinfection unit comprises a device for exposing the interior of the tube of the valve unit to a disinfection fluid and/or to electromagnetic radiation; and wherein the valve unit further comprises a fastening member which is adapted to fasten the valve unit to the spout of a tank container to ensure an aseptic connection between the valve unit and the tank container; and wherein at least one of the disinfection unit and the valve unit includes a positioning member to change the position of the valve unit in the disinfection unit.

12. The assembly according to claim 11, wherein the valve unit comprises a handle that penetrates the wall defining the interior space of the disinfection unit.

13. The assembly according to claim 11, wherein the positioning member comprises an electric actuator, a pneumatic actuator or a hydraulic actuator.

14. A combination comprising:

(1) a tank container defining an interior, and (2) an assembly comprising a valve unit and a disinfection unit to provide an aseptic connection between the valve unit and the tank container, wherein the tank container comprises:

a tank container spout to allow for supply and discharge of a liquid; and an inliner in an interior of the tank container, wherein the inliner comprises an inner environment and an inliner spout to supply and discharge the liquid, wherein the inliner spout is present in the tank container spout; and wherein the disinfection unit comprises a wall defining an interior space, the wall comprising an opening for receiving the valve unit into the interior space of the disinfection unit, the opening being adapted to abut and/or enclose the tank container spout; and wherein the valve unit is present in the interior space of the disinfection unit and comprises a tube having:

a first end portion comprising a valve that is configured to open and close the tube at the first end portion;

a second end portion; and an interior that extends from the valve to the second end portion; wherein the disinfection unit comprises a device for exposing the interior of the tube of the valve unit to a disinfection fluid and/or to electromagnetic radiation; and wherein the valve unit further comprises a fastening member which is adapted to fasten the valve unit to the tank container spout to ensure an aseptic connection between the valve unit and the tank container; and wherein at least one of the disinfection unit and the valve unit includes a positioning member to change the position of the valve unit in the disinfection unit; and wherein the second end portion of the tube is present in the inliner spout so that there is a fluid connection between the second end portion of the tube and the inliner spout; and wherein the valve unit is fastened to the tank container spout to ensure an aseptic connection between the valve unit and the tank container.

15. The combination according to claim 14, wherein the disinfection unit is connected to the tank container or to the tank container spout.

16. The combination according to claim 14, wherein the inliner is folded and/or rolled up so that an available volume in the interior of the inliner is less than 0.01% of a volume of the interior of the tank container.

* * * * *